(12) United States Patent
Hou et al.

(10) Patent No.: US 9,491,398 B1
(45) Date of Patent: Nov. 8, 2016

(54) SYSTEM AND METHOD FOR PROCESSING ASSORTED VIDEO SIGNALS

(71) Applicant: Pixelworks, Inc., Portland, OR (US)

(72) Inventors: Yongmin Hou, Shanghai (CN); Yanxin Li, Shanghai (CN); Jian Zhou, San Jose, CA (US); Miao Sima, Shanghai (CN); Neil D. Woodall, Newport Beach, CA (US); Bob Zhang, Santa Clara, CA (US)

(73) Assignee: PIXELWORKS, INC., Portland, OR (US)

( * ) Notice: Subject to any disclaimer, the term of this patent is extended or adjusted under 35 U.S.C. 154(b) by 202 days.

(21) Appl. No.: 13/931,416

(22) Filed: Jun. 28, 2013

Related U.S. Application Data

(63) Continuation of application No. 12/974,319, filed on Dec. 21, 2010, now abandoned.

(51) Int. Cl.
*H04N 5/14* (2006.01)
*H04N 7/01* (2006.01)

(52) U.S. Cl.
CPC ..................................... *H04N 7/013* (2013.01)

(58) Field of Classification Search
None
See application file for complete search history.

(56) References Cited

U.S. PATENT DOCUMENTS

| | | | |
|---|---|---|---|
| 4,876,596 A | 10/1989 | Faroudja | |
| 4,982,280 A | 1/1991 | Lyon et al. | |
| 4,998,287 A | 3/1991 | Katznelson et al. | |
| 5,317,398 A | 5/1994 | Casavant et al. | |
| 5,337,154 A | 8/1994 | Dorricott et al. | |
| 5,446,497 A | 8/1995 | Keating et al. | |
| 5,563,651 A | 10/1996 | Christopher et al. | |
| 5,689,301 A | 11/1997 | Christopher et al. | |
| 5,734,420 A | 3/1998 | Lee et al. | |
| 5,742,352 A | 4/1998 | Tsukagoshi | |
| 5,748,251 A | 5/1998 | Nishimura | |
| 5,748,256 A | 5/1998 | Tsukagoshi | |
| 5,757,435 A | 5/1998 | Wells | |
| 5,815,215 A | 9/1998 | Yang | |
| 5,828,786 A | 10/1998 | Rao et al. | |
| 5,844,618 A | 12/1998 | Horiike et al. | |
| 5,861,924 A | 1/1999 | Pan et al. | |
| 5,870,151 A | 2/1999 | Korber | |
| 5,937,090 A | 8/1999 | Kim | |
| 5,959,681 A | 9/1999 | Cho | |
| 6,002,386 A | 12/1999 | Gu | |
| 6,002,797 A | 12/1999 | Mori et al. | |
| 6,014,182 A | 1/2000 | Swartz | |
| 6,018,588 A | 1/2000 | Kim | |
| 6,049,626 A | 4/2000 | Kim | |
| 6,058,140 A | 5/2000 | Smolenski | |

(Continued)

*Primary Examiner* — James M Anderson, II
(74) *Attorney, Agent, or Firm* — Marger Johnson

(57) ABSTRACT

A method and system for detecting and processing a series of video frames includes receiving the series of video frames, determining whether the video frames are associated with a recognized non-video source, and depending on the determination, processing the video frames using a variety of techniques. A system may detect whether each video frame is a repeat frame or a new original frame, keep the new original frames, discard the repeat frames, and then adjust one or more timestamps associated with the new original frames so as to conform to an intermediate frame rate. The frame indexes and timestamps associated with the new original frames are stored in a FIFO or buffer. The system can interpolate video frames using the stored timestamps, and output a series of video frames. The output video stream is delivered at any frame rate and can include original video frames and interpolated video frames.

17 Claims, 13 Drawing Sheets

(56) References Cited

U.S. PATENT DOCUMENTS

| | | |
|---|---|---|
| 6,101,274 A | 8/2000 | Pizano et al. |
| 6,108,041 A | 8/2000 | Faroudja et al. |
| 6,185,329 B1 | 2/2001 | Zhang et al. |
| 6,201,577 B1 | 3/2001 | Swartz |
| 6,204,883 B1 | 3/2001 | Tsukagoshi |
| 6,208,385 B1 | 3/2001 | Konishi et al. |
| 6,226,041 B1 | 5/2001 | Florencio et al. |
| 6,226,046 B1 | 5/2001 | Yamagata et al. |
| 6,262,773 B1 | 7/2001 | Westerman |
| 6,331,874 B1 | 12/2001 | de Garrido et al. |
| 6,340,990 B1 | 1/2002 | Wilson |
| 6,366,699 B1 | 4/2002 | Kuwano et al. |
| 6,366,706 B1 | 4/2002 | Weitbruch |
| 6,449,015 B1 | 9/2002 | Sugaya |
| 6,459,455 B1 | 10/2002 | Jiang et al. |
| 6,563,550 B1 | 5/2003 | Kahn et al. |
| 6,608,930 B1 | 8/2003 | Agnihotri et al. |
| 6,621,927 B1 | 9/2003 | Mori et al. |
| 6,700,622 B2 | 3/2004 | Adams et al. |
| 6,724,433 B1 | 4/2004 | Lippman |
| 6,757,022 B2 | 6/2004 | Wredenhagen et al. |
| 6,822,691 B1 | 11/2004 | Kim et al. |
| 6,829,013 B2 | 12/2004 | Thompson et al. |
| 6,839,094 B2 | 1/2005 | Tang et al. |
| 6,842,194 B1 | 1/2005 | Sugihara |
| 6,859,237 B2 | 2/2005 | Swartz |
| 6,862,368 B1 | 3/2005 | He et al. |
| 6,867,814 B2 | 3/2005 | Adams et al. |
| 6,897,903 B1 | 5/2005 | Hu |
| 6,898,243 B1 | 5/2005 | Alvarez |
| 6,909,466 B1 | 6/2005 | Scheffler et al. |
| 6,909,469 B2 | 6/2005 | Adams |
| 6,928,191 B2 | 8/2005 | Goertzen |
| 6,970,206 B1 | 11/2005 | Swan et al. |
| 7,612,829 B2 | 11/2009 | Chow |
| 8,320,749 B1 * | 11/2012 | van Welzen et al. ......... 386/347 |
| 2001/0002853 A1 | 6/2001 | Lim |
| 2002/0054236 A1 | 5/2002 | Wredenhagen et al. |
| 2002/0057368 A1 | 5/2002 | Fakhruddin |
| 2002/0149703 A1 | 10/2002 | Adams et al. |
| 2003/0098924 A1 | 5/2003 | Adams et al. |
| 2005/0099538 A1 | 5/2005 | Wredenhagen et al. |
| 2007/0030384 A1 | 2/2007 | Wredenhagen et al. |
| 2007/0211167 A1 | 9/2007 | Adams et al. |
| 2010/0091181 A1 * | 4/2010 | Capps ............... G09G 5/397 348/441 |
| 2010/0134680 A1 * | 6/2010 | Hong ............... 348/441 |
| 2011/0019083 A1 * | 1/2011 | Cordes et al. ............... 348/441 |

* cited by examiner

SYSTEM AND METHOD FOR PROCESSING ASSORTED VIDEO SIGNALS

CROSS REFERENCE TO RELATED APPLICATION

This application is a continuation of U.S. patent application Ser. No. 12/974,319 filed Dec. 21, 2010, entitled "System and Method for Processing Assorted Video Signals", which is incorporated herein by reference in its entirety.

BACKGROUND

Video standards are constantly evolving. Video source standards include, for example, interlaced formats such as NTSC 60 Hertz (Hz) or PAL 50 Hz. Progressive video formats include video signals having a progressive or non-interlaced scan, with the number of scan lines corresponding to 480p, 720p, or 1080p, among others. Some video sources include film sources, which were originally recorded at a rate of 24 frames per second, and then upsampled to a different frame rate such as 30 frames per second. The upsampling algorithms are typically referred to as 2:2 pulldown, 3:2 pulldown, etc., and which are sometimes referred to as "cadences." Still other video sources include computer generated graphics, variable frame rate internet video, dropped frames, bad edits, and/or low frame rates. Moreover, there are many types of video terminals proliferating on the market, including for example 60 Hz, 120 Hz, and 240 Hz panels.

Due to the expansion of video source types and video terminal types available, it is becoming increasingly difficult to bridge the assorted types of video signals with the assorted types of video terminals, while maintaining smooth and visually pleasing video signals. The gradual migration of video services to networks such as the Internet exasperates the problems because of the inherent unpredictability and performance bottlenecks associated with bandwidth limitations, and the sheer complexity and vastness of large networks such as the Internet. In addition, there is a technological gap between the assorted video source types and the capabilities of video display terminals to display the variety of video signals that are available.

Accordingly, a need remains for an improved system and method for processing assorted video signals. It would be desirable for a video system to receive a video signal, having any input frame rate or other unique characteristic, and generate a video signal having any output frame rate, while delivering smooth and visually pleasing video.

DETAILED DESCRIPTION OF THE EMBODIMENTS

Figure 1:
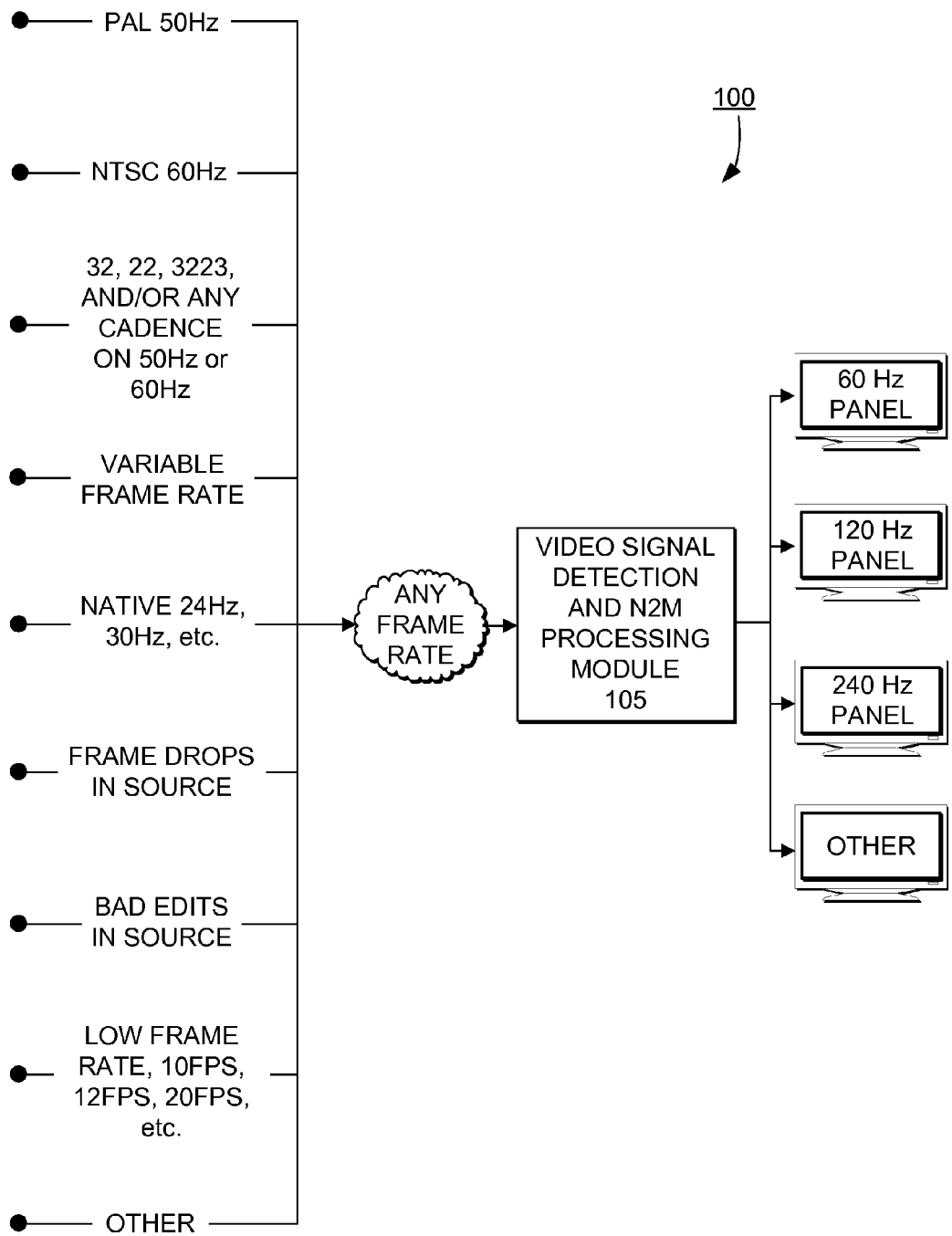
FIG. 1 is a schematic diagram of a system for bridging assorted video signals and assorted video terminals, including a video signal detection and N2M processing module, according to some embodiments of the present invention.

FIG. 1 is a schematic diagram 100 of a system for bridging assorted video signals and assorted video terminals, including a video signal detection and N2M processing module 105, according to some embodiments of the present invention. The video signal detection and N2M processing module 105 receives any one of a variety of video signal types, including various characteristics, and then outputs a video signal to any one of a variety of video terminal types.

The video source types can include, for example, PAL 50 Hz, NTSC 60 Hz, including any interlaced or progressive format. The video source types can also include, for example, embedded film such as 3:2 pulldown, 2:2 pulldown, 3:2:2:3 pulldown, among a variety of other embedded film pulldown types. The video source types can also include variable frame rate video including types used in association with the Internet, and/or low frame rate such as 10 frames per second, 12 frames per second, 20 frames per second, and so forth. The video source types can include native 24 Hz or 30 Hz sources, among other native sources. The video signal coming from the source can also include dropped frames, which is common when used in combination with a network such as the Internet. Bad edits might also be included in the video source signal. In short, the video source types can include any video signal having any frame rate, and including any unique characteristics such as bad edits and dropped frames.

It should be understood that while reference is generally made herein and throughout to a video "frame" or "frames," such term is intended to be construed broadly to include any video image or images, which may include a video frame, one or more video fields, or any combination thereof. Persons with skill in the art will recognize that video frames in a progressive format are sometimes referred to as fields, with a 1 field to 1 frame correspondence.

For most interlaced video formats, a video frame generally includes two video fields, sometimes referred to as odd and even fields. Persons with skill in the art will also recognize that the potential exists for more than two fields in a frame. It should be understood that while some embodiments of the invention described herein refer to "frames," any such embodiments can equally apply to "fields" of frames. It should also be understood that some of the embodiments and aspects of the invention described herein can be used with either progressive or interlaced formatted video inputs, or both. None of the embodiments should be construed as limited to only one or the other formats, unless specifically described as such. Also, the term "video signal" as used herein generally refers to a series of video frames, which may be transmitted over air-waves or conductors.

The video signal detection and N2M processing module 105 receives a series of video frames having any frame rate, and then processes the video frames. The processing can include, for example, determining whether the series of video frames is associated with a recognized non-video source or not, and then processing the series of frames using similar or different techniques based on the determination, as explained in more detail below. The video signal detection and N2M processing module 105 then outputs a video signal, which is compatible with a particular or desired video terminal, such as the 60 Hz panel, the 120 Hz panel, the 240 Hz panel, and/or other suitable panel types, as illustrated in FIG. 1.

Irrespective of the video source type, format, frame rate, or other unique characteristics of the source video signal, the module 105 can produce video signals that are displayed on any video terminal type, where the displayed video is smooth and visually pleasing. The video signal detection and N2M processing module 105 can receive an interlaced video signal, and after performing N2M cadence detection, it can deinterlace the signal to create a progressive format video output signal, as further described below.

Figure 2:
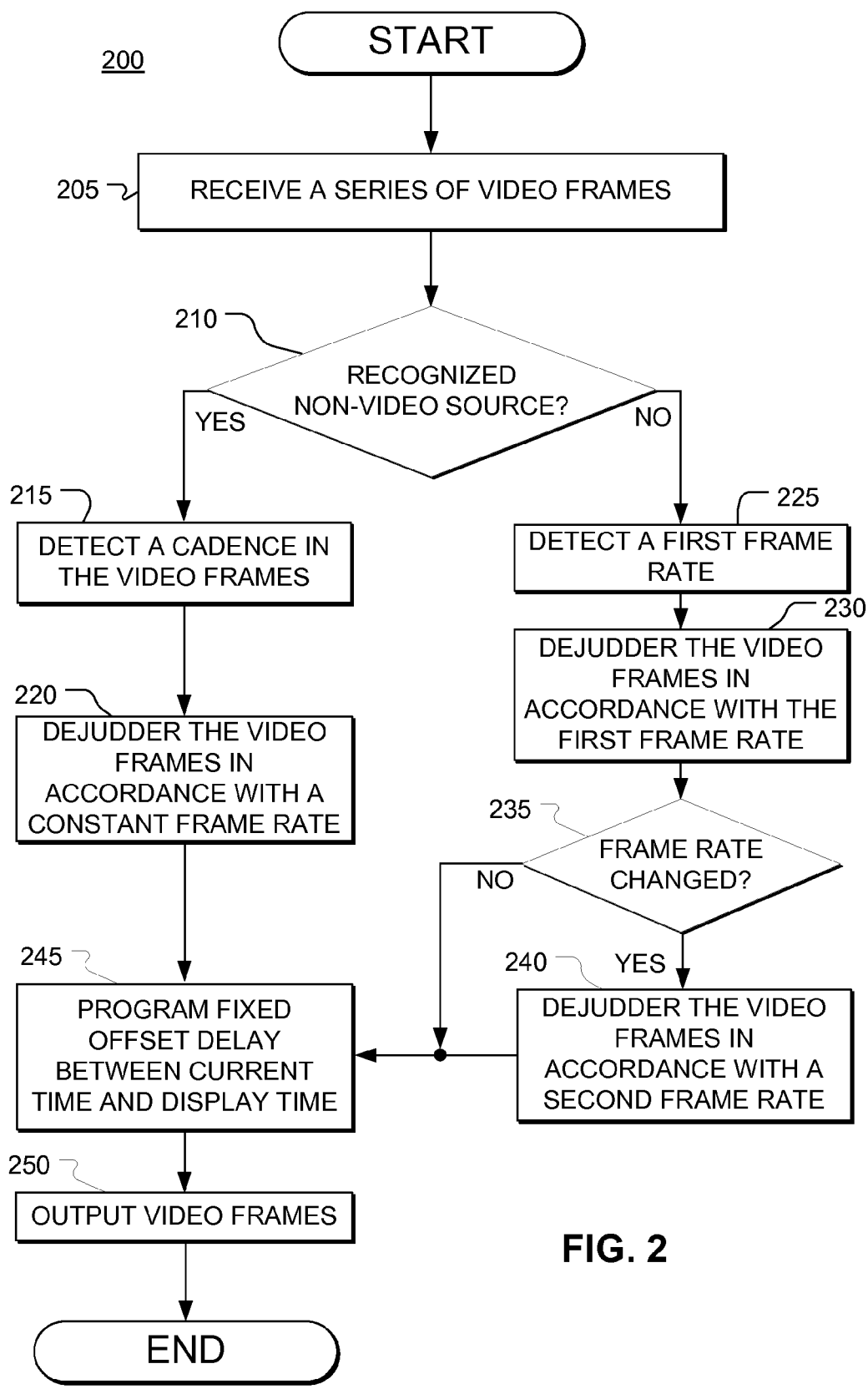
FIG. 2 is a flow diagram illustrating techniques for processing video signals according to some embodiments of the present invention.

FIG. 2 is a flow diagram 200 illustrating techniques for processing video signals according to some embodiments of the present invention. The flow diagram begins at 205 where a series of video frames are received at the video signal detection and N2M processing module 105. A determination is made at 210 whether the series of video frames is associated with a recognized non-video source. The term "non-video source" is intended herein to mean a video signal in which a typical non-video source is embedded, such as 24 frames per second film. The non-video source is "recognized" if it can be correlated with typical non-video content.

For instance, if the incoming video stream includes a non-video source, which can be correlated to typical non-video content for which the video signal detection and N2M processing module 105 is aware, then the non-video source would be considered "recognized" and the appropriate processing technique applied, as explained in further detail below. Otherwise, if the non-video source is not recognized, due to it being unrecognizable because of dropped frames, or due to a lack of knowledge of the source type by the module 105, then the non-video source would be considered "non-recognized" and either similar or different processing techniques can be applied, as also further explained below.

If the determination at 210 is YES, a constant frame rate is inferred, and the flow proceeds to 216 where a cadence is detected in the video frames. The cadence can include, for example, 2:2 pulldown, 3:2 pulldown, etc., among other cadences. The flow then proceeds to 220 where the video frames are dejuddered in accordance with the constant frame rate, as further described below.

Otherwise, if the determination at 210 is NO, a variable frame rate is inferred, and the flow proceeds to 225 where a first frame rate of the series of video frames is detected. The flow then proceeds to 230 where the video frames are dejuddered in accordance with the first frame rate. If the frame rate changes at 235, or in other words, if at least a second frame rate is detected in the series of video frames, then the video frames are dejuddered in accordance with the second frame.

In both the case of a constant video frame rate and a variable video frame rate, the flow meets at 245, where a fixed delay offset between a current time position (CT) and a display time position (DT) is programmed, as also described in detail below. Thereafter, the flow proceeds to 250 and a series of video frames are output. The output video frames can include, for example, original video frames from the input video frames, interpolated video frames, video frame corrections, and so forth.

Figure 3:
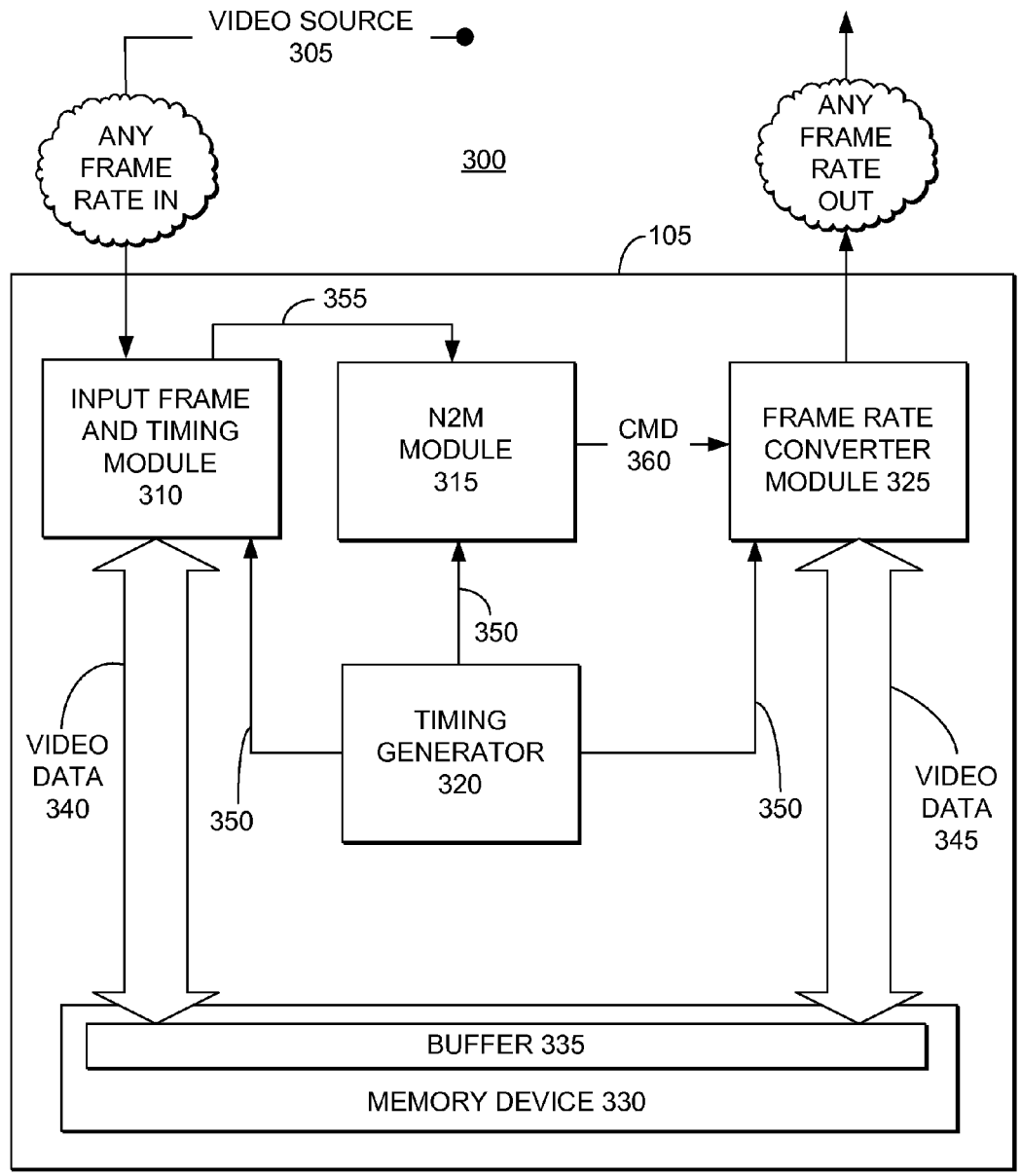
FIG. 3 illustrates a block diagram showing details of the video signal detection and N2M processing module of FIG. 1, including an input frame and timing module.

FIG. 3 illustrates a block diagram 300 showing details of the video signal detection and N2M processing module 105 of FIG. 1, including an input frame and timing module 310. The input frame and timing module 310 receives a series of video frames having any frame rate from video source 305, and may store some or all of the video frames as video data 340 in a buffer 335 of memory device 330. The module 310 can detect whether each new current input frame is either a repeat frame or a new original frame.

In other words, for reasons such as embedded film sources or dropped frames, some video frames are often repeated in a video stream, and the module 310 judges and determines whether there is a repeat by comparing differences, such as motion differences, between a current input frame and a previously received input frame. If there are no or few differences between the current input frame and the previously received input frame, then the module 310 determines that the frame is a repeat. On the other hand, if there are differences beyond a certain threshold between the current input frame and one or more of the previously received input frames, then the module 310 determines that the frame is a new original frame.

The input frame and timing module 310 associates a timestamp with each video field of each video frame when received, including video fields for repeat frames and new original frames. A different timestamp can be associated with each field of each frame. In other words, for interlaced video, in which a frame is typically a pair of fields, each field can initially be assigned a different timestamp. In the case of progressive formatted video, in which a frame is typically a single field, a different timestamp applies to each field.

The module 310 gets "time axis" information 350, or in other words, accurate time and/or position information, from a timing generator 320. The timing generator 320 produces the time axis information 350 for coordinating video timing across one or more modules, such as 310, 315, and 325. For example, the time axis information 350 can include vertical sync (VS), horizontal sync (HS), and other information, which may be related to a particular video terminal or monitor. The timing generator 320 can also produce timing information such as a counter, clock value, HS counter, VS counter, and so forth, which can be included in the time axis information 350, and which can include whole-system timing coordinates. The module 310 uses the time axis information to accurately assign the timestamp to each incoming video frame and/or field.

At about the time of associating timestamps to a video frame and/or field, the input frame and timing module 310 can determine whether or not to "keep" the frame and/or field. For instance, if the video frame is a repeat frame, then the frame does not need to be "kept" or stored any longer. Conversely, if the video frame is a new original frame, then the frame is "kept" and stored in the buffer 335 of the memory device 330.

More specifically, the input frame and timing module 310 can determine whether or not the last stored frame is overwritten by the next frame. For instance, if the video frame that is stored is a repeat frame, then such repeat frame can be overwritten by the next frame, and the repeat frame need not be stored any longer. Conversely, if the video frame that is stored is a new original frame, then such new original frame is not overwritten by the next frame.

In the case of interlaced formatted video, the input frame and timing module 310 determines whether or not to overwrite the last stored field by the next field. For instance, if the input video source includes a 3:2 film mode video signal, then the input video can have three fields of a first frame and two fields of the next frame. As such, the input frame and timing module 310 can determine to overwrite only one of the three fields of the first frame. In the case of progressive formatted video, the decision whether to overwrite the last stored frame is usually a decision whether to overwrite the last stored field because of the one-field-per-frame format of progressive video signals.

For those video frames and/or fields that are not overwritten (i.e., the kept new original frames and/or fields), a frame and/or field index indicating where the frame and/or field is stored, and a timestamp indicating when the frame and/or field was received, are stored into a first-in-first-out (FIFO) list or buffer, which may be located in the memory device 350. The stored timestamps are based on the time axis information, and each stored frame and/or field index and timestamp corresponds to one new original frame and/or field received by the input frame and timing module 310. Such information, sometimes referred to herein as timing information 335, can also be transmitted to or accessed by the N2M module 315. As mentioned above, in the case of interlaced formatted video, the timestamp can apply to each field of each frame. In the case of progressive formatted video, the timestamp applies to each frame, which is typically a single field.

The N2M module 315 also receives the time axis information 350 from the timing generator 320. The N2M module 315 can program a fixed offset delay, using the time axis information 350, between a current time position (CT) and a display time position (DT). The offset delay is preferably a multiple of the change in time between two adjacent stored timestamps, or in other words, between two adjacent timestamps associated with corresponding new original frames.

The N2M module 315 can search the FIFO or buffer produced by the input frame and timing module 310, and can use that information to determine the offset delay. The offset delay can be, for example, two times the change in time between two adjacent stored timestamps, or another suitable value to achieve a smallest possible frame delay without impacting the output video stream. In addition, the N2M module 315 produces an interpolation phase based on the display time position (DT) and at least two adjacent stored timestamps. The N2M module 315 produces a command 360, which includes the interpolation phase, and frame indexes for video frames associated with the stored adjacent timestamps. Additional details regarding the offset delay, the interpolation phase, and the command are set forth below.

The command 360 is transmitted from the N2M module 315 to a frame rate converter module 325. The frame rate converter 315 also receives the time axis information 350 from the timing generator 320. The frame rate converter module 325 then interpolates one or more output video frames based on the interpolation phase and the frame indexes for the video frames associated with the stored adjacent timestamps. The frame rate converter module 325 outputs a series of video frames including original frames and one or more interpolated video frames, some or all of which may be received as video data 345 from the buffer 335, and then transmitted externally to a video terminal or monitor. The video stream output from the frame rate control unit 325 can include any frame rate, in accordance with any requirements of the various video terminals or panels. Additional details regarding the interpolation of frames are described below.

Figure 4:
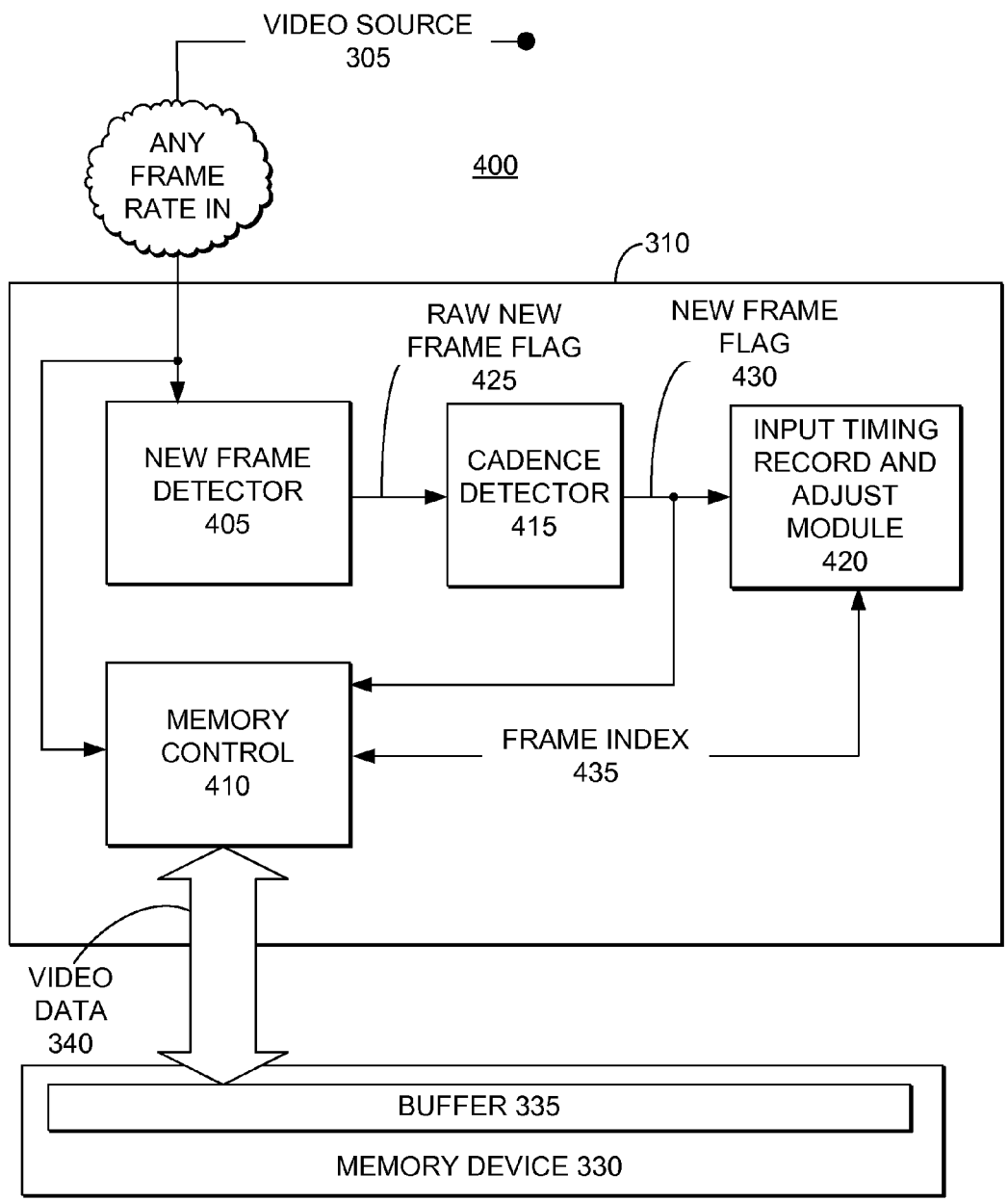
FIG. 4 illustrates a block diagram including details of the input frame and timing module of FIG. 3.

FIG. 4 illustrates a block diagram 400 including details of the input frame and timing module 310 of FIG. 3. The input frame and timing module 310 can include a new frame detector 405, a cadence detector 415, a memory control 410, and an input timing record and adjust module 420. The new frame detector 405 can produce a raw new frame flag 425 indicating whether each video frame is a repeat frame or a new original frame, which it then transmits to the cadence detector 415.

The cadence detector 415 correlates one or more recognized non-video source patterns with the raw new frame flag to produce a correlation value for each video frame. The correlation can include template matching, among other suitable correlation algorithms. Examples of suitable correlation algorithms are set forth in co-pending U.S. application Ser. No. 12/883,974 entitled "A System and Method For Detecting a Non-Video Source in Video Signals," which is hereby incorporated by reference.

Moreover, where template matching is used, when the raw new frame flag 425 matches a given template for a certain period of time, but there are few mismatch points, the raw new frame flag 425 can be refined into the new frame flag 430. If the cadence detector 415 determines that the input video source 305 is not one of a typical and/or recognized non-video source, then the raw new frame flag 425 need not be refined, and the new frame flag 430 may be equivalent to the raw new frame flag 425. Additional details regarding the new frame flag refining process are provided below.

The cadence detector 415 can detect the correlation with typical non-video content, such as film32, film22, film3223, film32322, film4222, film55, among other possible typical non-video content. If the correlation value of certain typical and/or recognized non-video is larger than a threshold for a predefined period of time, then the input source type can be determined based on the correlated source type. The cadence detector 415 then produces a refined new frame flag 430, which is based on the raw new frame flag 425 and the correlation values. The cadence detector 415 can also output the source type, such as film32, film22, video, film3223, and so forth.

The determination for whether to overwrite a previous frame with a new original frame can be based on the new frame flag 430. Similarly, the determination for whether to increment a frame index for each new original frame can also be based on the new frame flag 430. After the overwrite determination is made, a previous frame is overwritten with the new original frame, and the timestamp and/or frame index for the original new frame is stored in the FIFO or buffer. More specifically, the new frame flag 430 can be transmitted to the memory control 410, which can determine whether a previous frame should be overwritten with the new original frame, and whether the frame index should be incremented.

The input timing record and adjust module 420 can adjust the timestamp for one or more of the new original frames and/or fields in accordance with an intermediate frame rate, and then store the adjusted timestamps for the new original frames and/or fields in the FIFO or buffer. In some embodiments, the input frame rate is detected, and the timestamps for one or more of the new original frames and/or fields is adjusted to conform to the intermediate frame rate, which is different from the input frame rate. For interlaced video formats, the video fields can initially have different timestamps, but if the video input is associated with a recognized non-video source, then the timestamps can be adjusted so that both fields for a given video frame have the same timestamp.

The N2M module 315 (of FIG. 3) can use the stored timestamps, including the adjusted timestamps, to produce the interpolation values. The frame rate converter 325 (of FIG. 3) can interpolate one or more output video frames using the interpolation values, the stored timestamps, and/or the stored frame indexes. The frame rate converter 325 can then output video frames at a particular output frame rate. The output frame rate is generally different from the constant frame, the variable frame rate, and/or the intermediate frame rate.

Figure 5:
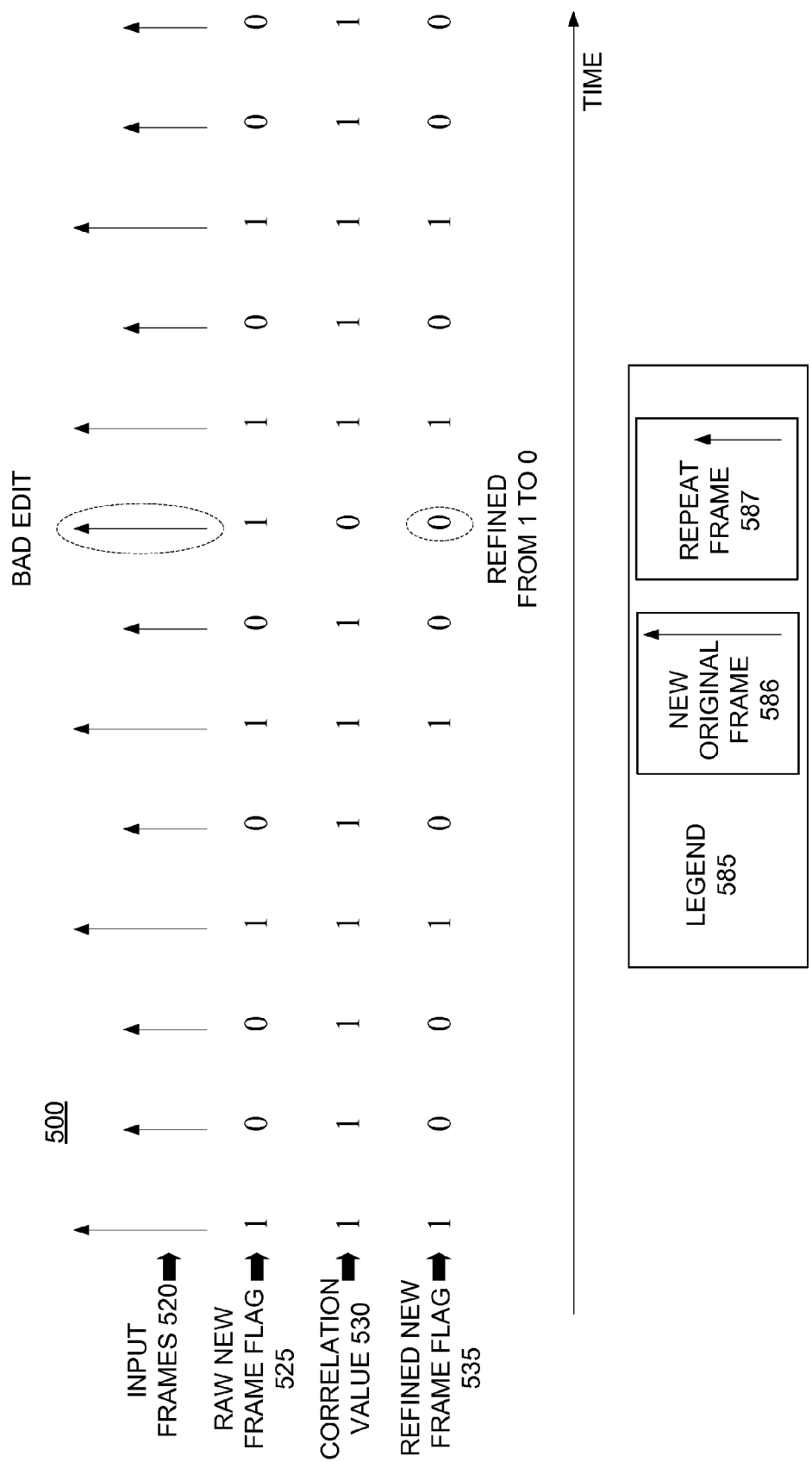
FIG. 5 illustrates a timing diagram in which a bad edit is detected and refined in accordance with some embodiments.

FIG. 5 illustrates a timing diagram 500 in which a bad edit is detected and refined in accordance with some embodiments of the present invention. The input frames 520 represent a series of individual input video frames, some of which are new original frames 586 as indicated by legend 585, and some of which are repeat frames 587, as also indicated by legend 585. As illustrated, the raw new frame flag 525 indicates whether each of the received video frames is an apparent new original frame or a repeat frame. The correlation value 530 indicates whether each of the raw new frame flags 525 correlate to an expected non-video source pattern, such as film22, film 32, film3223, and so forth.

As shown in FIG. 5, while the raw new frame flag 525 indicates a '1' for the 8$^{th}$ video frame, such frame does not correlate to the non-video source, and so the correlation value 530 is set to '0' for the video frame having the bad edit. The refined new frame flag 535 is produced based on the raw new frame flag 525 and correlation values 530. In some embodiments, the refined new frame flag 535 is generated using an "AND" operation between each raw new frame flag 525 and each corresponding correlation value 530.

Figure 6:
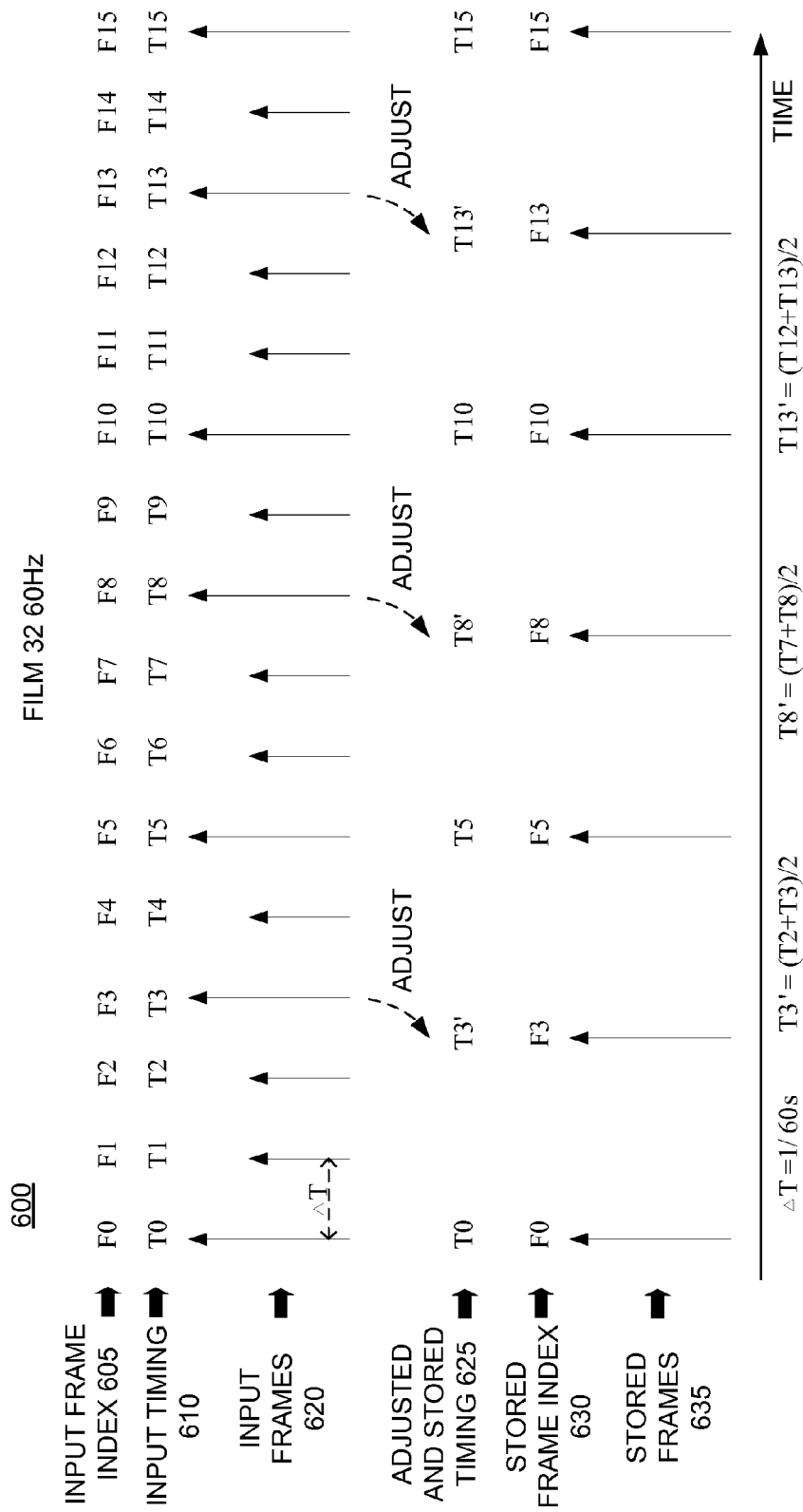
FIG. 6 illustrates a timing diagram in which timestamps for new original frames are adjusted and stored in accordance with some embodiments.

FIG. 6 illustrates a timing diagram 600 in which timestamps for new original frames are adjusted and stored in accordance with some embodiments. In this example, the input video source is film32 at 60 Hz. The input frame index 605 is a frame index associated with each incoming video frame. The input timing 610 represents timestamps associated with each incoming video frame. The input frames 620 are the received frames, including the new original frames indicated by the longer arrows and the repeat frames indicated by the shorter arrows. In FIG. 6, the change in time between two adjacent timestamps for the received frames is indicated by ΔT.

In some embodiments, one or more of the new original frames are selected to have their timing adjusted. For example, the new original frame associated with frame index F3 and timestamp T3 can have its timestamp adjusted to T3', which corresponds to (T2+T3)/2. Similarly, T8 can be adjusted to T8' and T13 can be adjusted to T13', as shown in FIG. 6. The adjustment can cause the new original frames to conform to an intermediate frame rate. The adjusted and stored timing 625 represents the timestamps for new original frames and adjusted new original frames, which are stored in the FIFO or buffer. The stored frame index 630 values correspond to frame indexes, which are associated with the stored new original frames 635.

Figure 7:
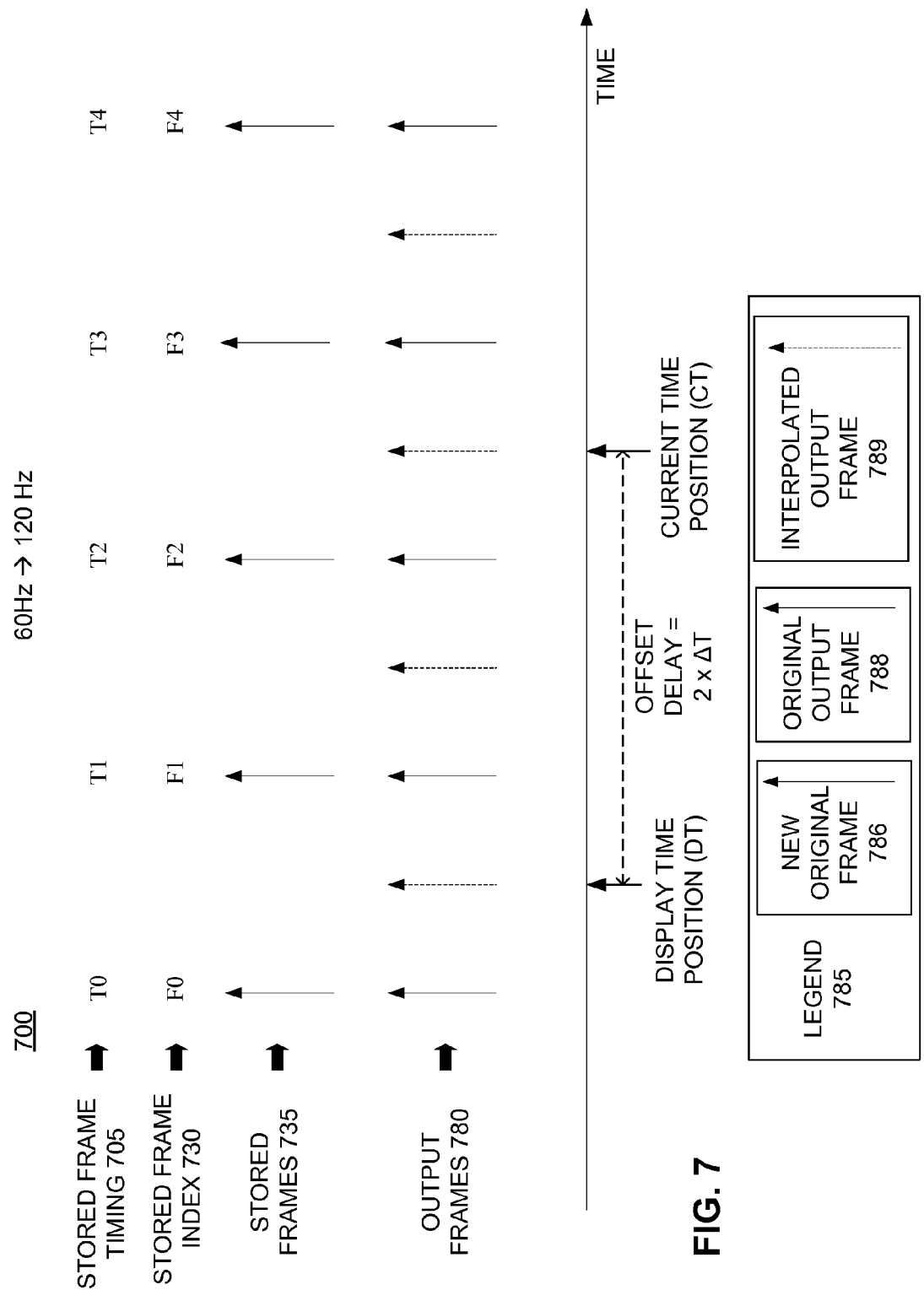
FIG. 7 illustrates a timing diagram in which an offset delay is programmed between a current time position and a display time position.

FIG. 7 illustrates a timing diagram 700 in which an offset delay is programmed between a current time position (CT) and a display time position (DT). A legend 785 is provided to show the arrow indicators for new original frames 786, original output frames 788, and interpolated output frames 789. The stored frame index 730 corresponds to frame indexes for each stored original new frame. The N2M control module 315 (of FIG. 3) programs an offset delay between a current time position (CT) and a display time position (DT). The offset delay is preferably a multiple of the change in time between two adjacent stored timestamps 705. The example shown in FIG. 7 shows the offset delay as 2×ΔT, where ΔT is the change in time between two adjacent stored timestamps 705, which correspond to the timestamps for stored frames 735 such as the new original frames, and in some cases, the adjusted new original frames.

When the display time position (DT) is between a first timestamp such as T0 and a second timestamp such as T1, the N2M control module 315 selects a frame associated with the first timestamp as a previous frame (P1), and selects a frame associated with the second timestamp as a current frame (CF). The N2M control module 315 also produces an interpolation phase in accordance with the formula: (DT minus T0) divided by (T1 minus T0).

In addition, the display time position (DT) is sometimes referred to as the "searched time" such that where T0<searched time<T1, then the N2M control module 315 produces a command including F1 as the frame index for the current frame (CF), and F0 as the frame index for the previous frame (P1). In this example, the interpolation phase is (searched time−T0) divided by (T1−T0). It should be understood that multiple interpolation phases are generated based on different display times and stored timestamps. The interpolation phase may be further adjusted so that phases close to zero are forced to zero and phases close to one are forced to one to reduce artifacts from the frame rate conversion process.

Figure 8:
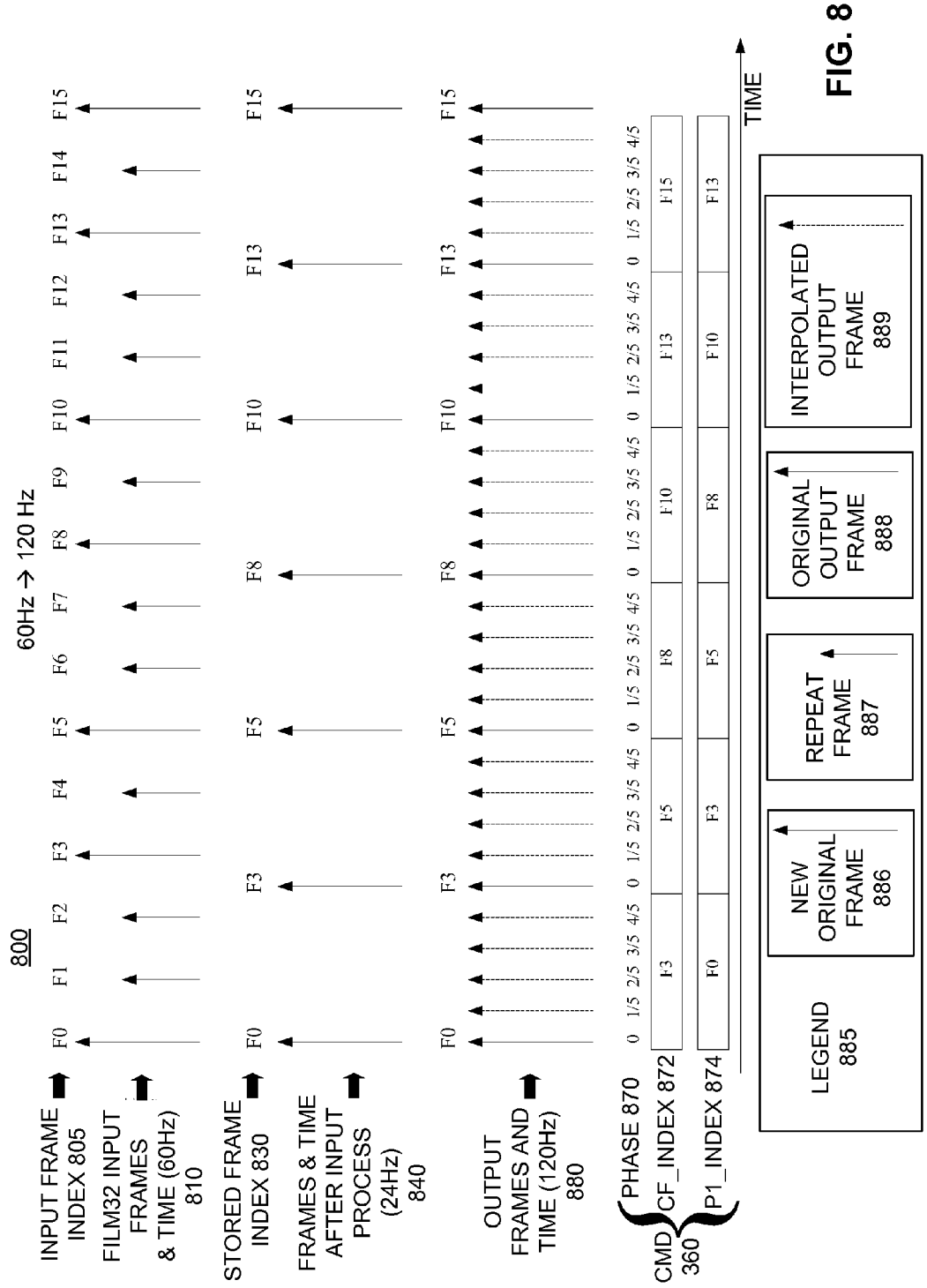
FIG. 8 illustrates a timing diagram in which a 60 Hz video signal is converted to an intermediate 24 Hz timing, and then output as a 120 Hz video signal.

FIG. 8 illustrates a timing diagram 800 in which a 60 Hz video signal is converted to an intermediate 24 Hz timing, and then output as a 120 Hz video signal. A legend 885 is provided to show the arrow indicators for new original frames 886, repeat frames 887, original output frames 888, and interpolated output frames 889. The input frame index 805 correspond to each received input video frame, including new original frames and repeat frames. In this example, film32 input frames and time (60 Hz) are shown at 810. The stored frame index 830 shows frame indexes, which are stored in the FIFO or buffer. The frames and timing after the input and adjust process 840 correspond to an intermediate frame rate of 24 Hz. The output frames and timing 880 show the output frames including original output frames and interpolated output frames. The command 360 includes the phase 870, the current frame index 872, and the previous frame index 874. Each command can be associated with one or more original or interpolated output frames.

In this example, the output frame rate is 120 Hz, and the phase values 870 include 0, 1/5, 2/5, 3/5, and 4/5. In any of the embodiments discussed herein, a memory-estimation-memory-correction (MEMC) portion (not shown) of the system can refine a phase value that is close to 0 or 1, by adjusting it down to 0 or up to 1. For example, if a phase is 0.95, the phase can be refined to 1.0. Although a slight amount of extra judder results from such refinement, it is too little to be noticed by a viewer of the video stream, and the benefit is that using the original frame produces fewer artifacts.

In some embodiments, the video signal detection and N2M processing module 105 can receive an interlaced video signal, and after performing N2M cadence detection as described herein and/or as described in co-pending U.S. application Ser. No. 12/883,974 entitled "A System and Method For Detecting a Non-Video Source in Video Signals," previously incorporated by reference, the processing module 105 can deinterlace the signal to create a progressive format video output signal.

Figure 9:
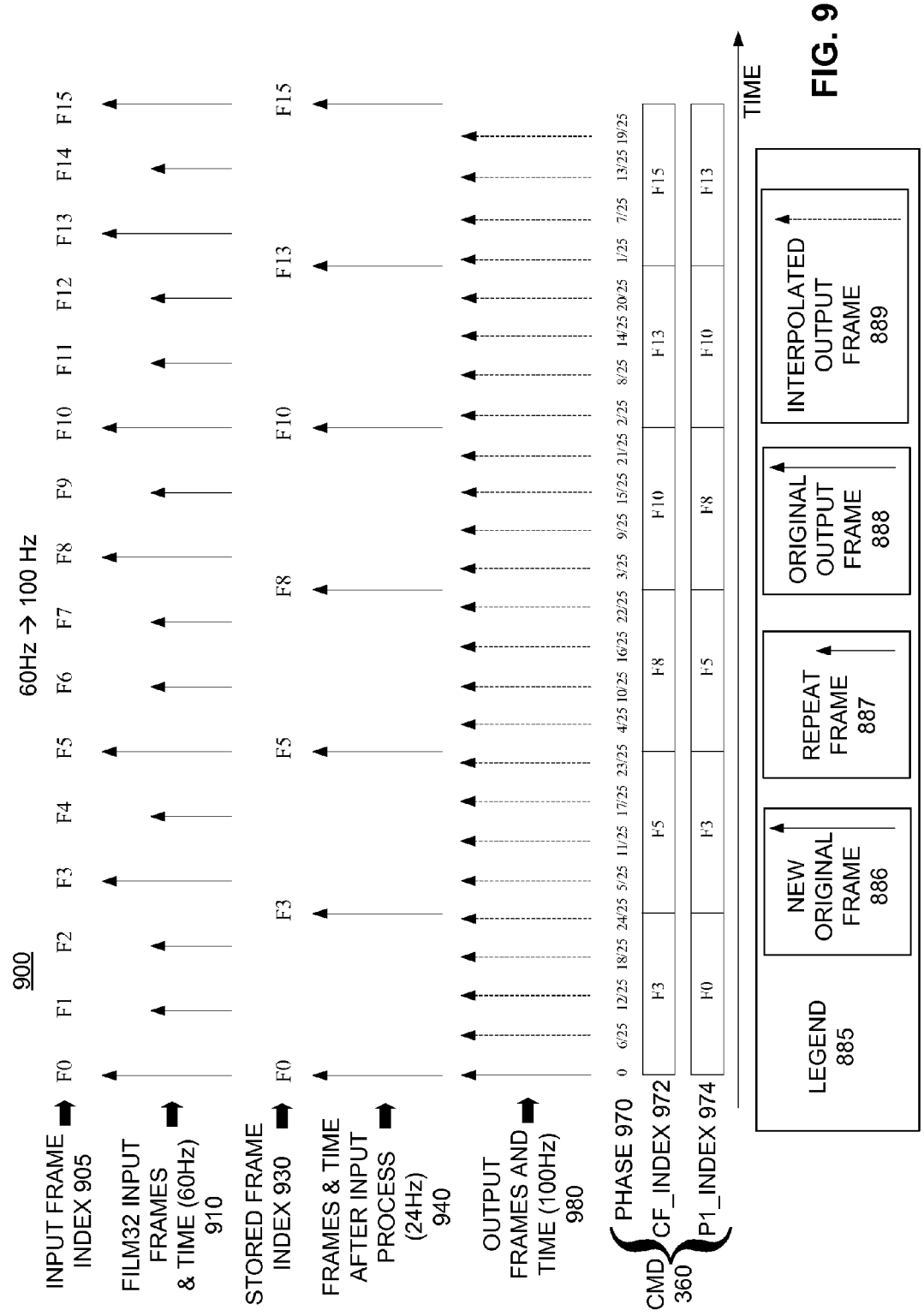
FIG. 9 illustrates a timing diagram in which a 60 Hz video signal is converted to an intermediate 24 Hz timing, and then output as a 100 Hz video signal.

FIG. 9 illustrates a timing diagram 900 in which a 60 Hz video signal is converted to an intermediate 24 Hz timing, and then output as a 100 Hz video signal. A legend 885, which corresponds to the legend of FIG. 8, is also included in FIG. 9. The input frame index 905 correspond to each received input video frame, including new original frames and repeat frames. In this example, film32 input frames and time (60 Hz) are shown at 910. The stored frame index 930 shows frame indexes, which are stored in the FIFO or buffer. The frames and timing after the input and adjust process 940 correspond to an intermediate frame rate of 24 Hz. The output frames and timing 980 show the output frames including original output frames and interpolated output frames. The command 360 includes the phase 970, the current frame index 972, and the previous frame index 974. Each command can be associated with one or more original or interpolated output frames.

Figure 10:
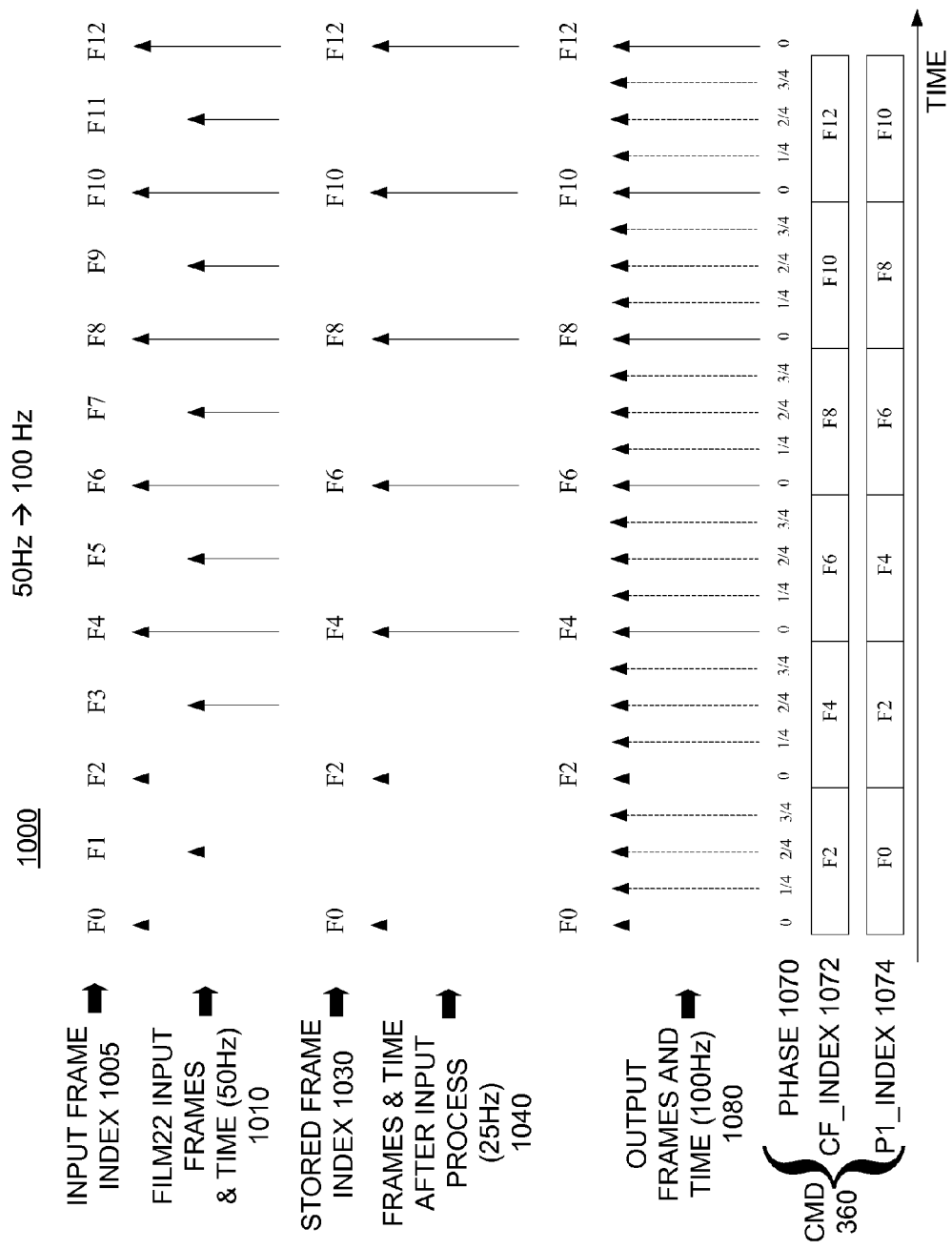
FIG. 10 illustrates a timing diagram in which a 50 Hz video signal is converted to an intermediate 25 Hz timing, and then output as a 100 Hz video signal.

FIG. 10 illustrates a timing diagram 1000 in which a 50 Hz video signal is converted to an intermediate 25 Hz timing, and then output as a 100 Hz video signal. Although a legend is not provided in this figure, reference can be made to legend 885 of FIG. 8. The input frame index 1005 correspond to each received input video frame, including new original frames and repeat frames. In this example, film22 input frames and time (50 Hz) are shown at 1010. The stored frame index 1030 shows frame indexes, which are stored in the FIFO or buffer. The frames and timing after the input and adjust process 1040 correspond to an intermediate frame rate of 25 Hz. The output frames and timing 1080 show the output frames including original output frames and interpolated output frames. The command 360 includes the phase 1070, the current frame index 1072, and the previous frame index 1074. Each command can be associated with one or more original or interpolated output frames.

Figure 11:
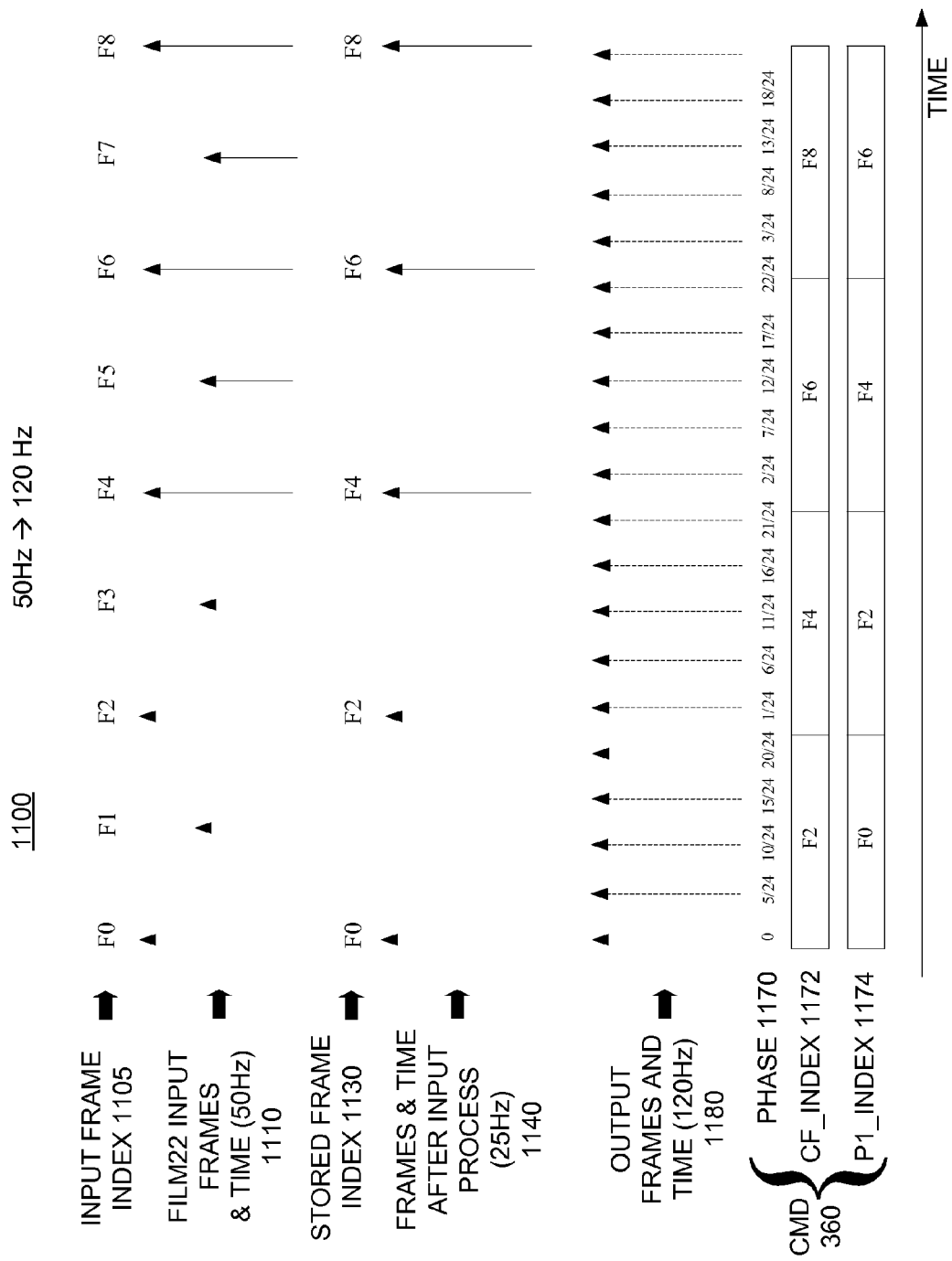
FIG. 11 illustrates a timing diagram in which a 50 Hz video signal is converted to an intermediate 25 Hz timing, and then output as a 120 Hz video signal.

FIG. 11 illustrates a timing diagram 1100 in which a 50 Hz video signal is converted to an intermediate 25 Hz timing, and then output as a 120 Hz video signal. Although a legend is not provided in this figure, reference can be made to legend 885 of FIG. 8. The input frame index 1105 correspond to each received input video frame, including new original frames and repeat frames. In this example, film22 input frames and time (50 Hz) are shown at 1110. The stored frame index 1130 shows frame indexes, which are stored in the FIFO or buffer. The frames and timing after the input and adjust process 1140 correspond to an intermediate frame rate of 25 Hz. The output frames and timing 1180 show the output frames including original output frames and interpolated output frames. The command 360 includes the phase 1170, the current frame index 1172, and the previous frame index 1174. Each command can be associated with one or more original or interpolated output frames.

Figure 12:
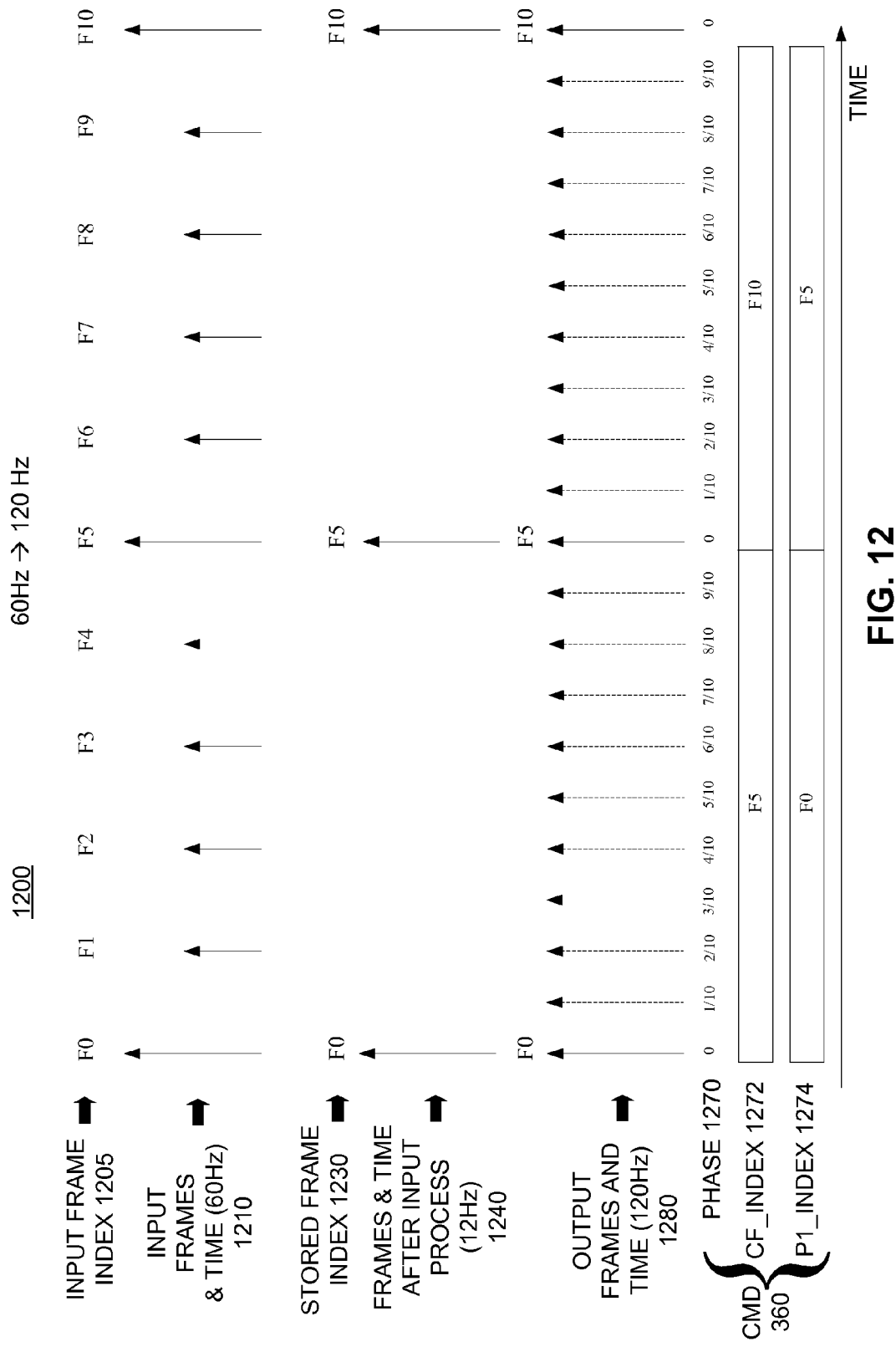
FIG. 12 illustrates a timing diagram in which a 60 Hz video signal is converted to an intermediate 12 Hz timing, and then output as a 120 Hz video signal.

FIG. 12 illustrates a timing diagram 1200 in which a 60 Hz video signal is converted to an intermediate 12 Hz timing, and then output as a 120 Hz video signal. Although a legend is not provided in this figure, reference can be made to legend 885 of FIG. 8. The input frame index 1205 correspond to each received input video frame, including new original frames and repeat frames. In this example, input frames and time (60 Hz) are shown at 1210. The stored frame index 1230 shows frame indexes, which are stored in the FIFO or buffer. The frames and timing after the input and adjust process 1240 correspond to an intermediate frame rate of 12 Hz. The output frames and timing 1280 show the output frames including original output frames and interpolated output frames. The command 360 includes the phase 1270, the current frame index 1272, and the previous frame index 1274. Each command can be associated with one or more original or interpolated output frames.

Figure 13:
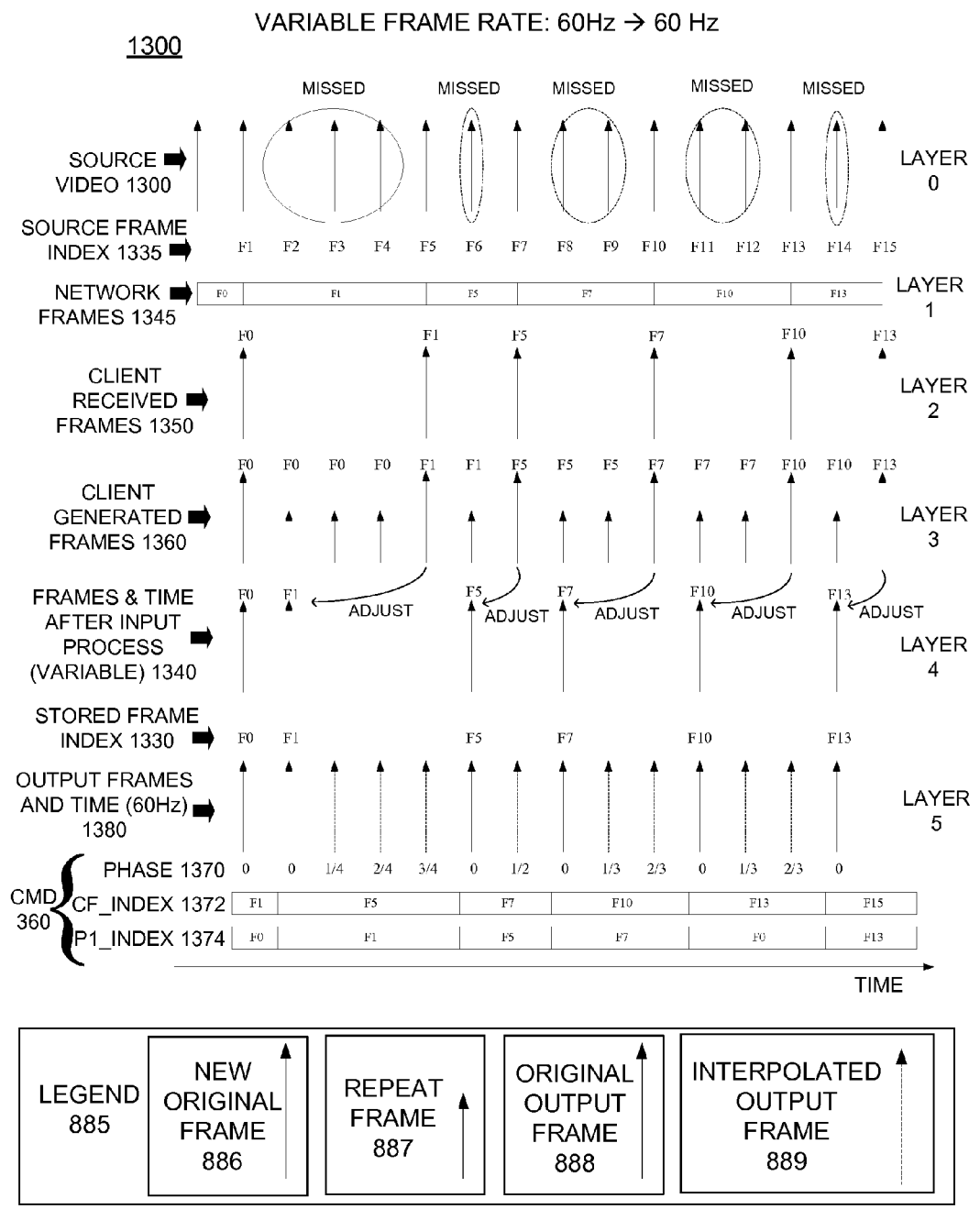
FIG. 13 illustrates a timing diagram in which a variable frame rate video signal is converted to an intermediate variable timing, and then output as a 60 Hz video signal.

FIG. 13 illustrates a timing diagram 1300 in which a variable frame rate video signal is converted to an intermediate variable timing, and then output as a 60 Hz video signal. A legend 885 is provided to show the arrow indicators for new original frames 886, repeat frames 887, original output frames 888, and interpolated output frames 889. In some cases, the video stream received can be associated with a variable frame rate and/or dropped video frames. For instance, for a network application, the received frame rate can vary as a result of the network status, available bandwidth, bottlenecks, and so forth. The timing diagram 1300 in an example diagram of how the system disclosed herein can handle variable rate video such as in the case of the network application.

Layer 0 represents source video 1300, which is the actual series of video frames from the video source. The video source can be a video server or some other node on a network. Alternatively, the video source can be a camera, a personal computer, a directly attached server, among other suitable possibilities. If on a network, then the network can affect the delivery of the video stream. For instance, when a network is bandwidth constrained, or otherwise has low bandwidth available, the network will likely not easily transfer a high frame rate video format such as 60 Hz 1080P from the server or host to the client because the necessary bandwidth for such an application would be on the order of 150M.

If such a transfer were attempted, it is likely that only some of the original frames having source frame index 1335 would actually be transferred to the client, and many others would be dropped or otherwise lost. Wireless networks can also cause video traffic issues where the wireless signal strength is less than ideal. In the case of interlaced video, one or more pairs of fields might be dropped in which each pair of fields corresponds to one frame. In the case of progressive video, one or more fields might be dropped in which each field corresponds to one frame.

Layer 1 shows the frames 1345 that are transmitted along the network data path. There are fewer "network" frames 1345 than there are source frame index values 1335 because many of the video frames were missed, or otherwise dropped or lost due to bandwidth constraints or other events. Assuming, for example, that under a good network status, it will take 1/60 of a second to transfer one frame. In this case, F0 is transferred to the client normally, whereas F1 occupies 4/60 of second, which is the equivalent of four "normal" frame transfer periods, because of network problems. The client, which can be a personal computer, handheld device, or other suitable computing device, will receive video frames 1350 associated with frame indexes F1 and F5, for example, but the original frames associated with F2, F3, and F4 will miss the client or will not be delivered to the client, as shown at Layer 2.

The client may also attempt to generate or re-transmit the video frames received from the server. For instance, the client can output the video frame associated with F0, but when it would have otherwise output the video frame associated with F1, it can't, because it has not yet received that video frame. To compensate, the client will repeat the video frame associated with F0 three times until the video frame associated with F1 arrives, as shown at Layer 3.

Layer 4 represents the stage in which embodiments of the present invention are applied to the video stream. The frames and timing after the input process is illustrated at 1340, which shows the new original frames and associated stored frame indexes, some of which have their timestamps adjusted, as described above. The stored frame indexes are shown at 1330. The system will not "keep" the repeat frames and will only "keep" the new original frames and store those into the buffer of the memory device. The frame indexes 1330 and associated timestamps (not shown), including any adjusted timestamps, are stored in a FIFO or buffer. As explained above, the N2M control module will generate the command 360, including the phase 1370, the current frame index 1372, and/or the previous frame index 1374, and transmit the command to the frame rate converter unit for further processing.

Layer 5 shows the output frames and timing (60 Hz) 1380. The result is the output of smooth and pleasing video, despite the input video sequence being randomly broken as a result of dropped or missed video frames. The output frames include original frames and interpolated frames. Although in this example, the input frame rate (60 Hz) is the same as the output frame rate (60 Hz), it should be understood that any frame rate can be received at the input, and any frame rate can be generated at the output. In addition, it should be understood that on a network, the frame rate can dynamically change depending on the conditions of the network.

Embodiments of the present invention can detect that the frame rate has changed, or otherwise detect that the video frames do not correlate with recognized non-video sources, and can adjust the algorithms accordingly. For instance, if the frame rate changes mid-video-stream, the embodiments disclosed herein could dynamically adjust the intermediate frame rate and/or the number and extent of the adjustments to the timestamps of the new original frames, and can otherwise alter the interpolation phase values, so that the end result is a smooth and visually pleasing video stream.

The following discussion is intended to provide a brief, general description of a suitable machine or machines in which certain aspects of the invention can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like.

The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciated that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the invention can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Other similar or non-similar modifications can be made without deviating from the intended scope of the invention. Accordingly, the invention is not limited except as by the appended claims.

What is claimed is:

1. A method for detecting and processing a series of video frames, the method comprising:
   receiving the series of video frames at an input rate less than an original frame rate, where a number of repeat frames in the series varies over time;
   determining whether the series of video frames is associated with a recognized non-video source by detecting a pattern of the repeat frames;
   using adjusted time stamps of the received frames to do frame interpolation, if the series of video frames is associated with a recognized non-video source; and
   using unadjusted the time stamps of the saved frames to do frame interpolation, when the series of video frames is associated with a non-recognized non-video source, wherein the unadjusted time stamps are used to dejudder a series of video frames at the input frame rate and then the unadjusted time stamps are used to dejudder the series of video frames at the original frame rate from the same non-recognized non-video source.

2. The method of claim 1, further comprising generating output frames having a fixed delay based upon the time stamps.

3. The method of claim 1, wherein the series of video frames is associated with a recognized non-video source, further comprising:
   inferring a constant frame rate of the series;
   detecting a cadence in the video frames; and
   dejuddering the video frames in accordance with the detected cadence and the constant frame rate.

4. The method of claim 1, wherein the series of video frames is associated with a non-recognized, non-video source, further comprising:
   detecting the first frame rate of the series of video frames;

dejuddering the series of video frames in accordance with the first frame rate;
detecting at least the second frame rate of the series of video frames; and
dejuddering the series of video frames in accordance with the second frame rate.

5. The method of claim 1, wherein adjusting the timestamp comprises:
detecting whether each video frame is a repeat frame or a new original frame;
adjusting the timestamp for one or more of the new original frames in accordance with an intermediate frame rate;
storing the timestamps for the new original frames, including the adjusted timestamps, in a buffer;
interpolating one or more output video frames using the stored timestamps; and
outputting a series of output video frames, including the one or more interpolated video frames, in accordance with an output frame rate.

6. The method of claim 5, wherein the output frame rate is different from a constant frame rate.

7. The method of claim 5, wherein the output frame rate is different from a variable frame rate.

8. The method of claim 5, wherein the output frame rate is different from the intermediate frame rate.

9. A method for detecting and processing a series of video frames, the method comprising:
receiving the series of video frames;
determining whether the series of video frames is associated with a recognized non-video source;
using adjusted time stamps of the received frames to do frame interpolation, if the series of video frames is associated with a recognized non-video source;
using unadjusted the time stamps of the saved frames to do frame interpolation, when the series of video frames is associated with a non-recognized non-video source, wherein the unadjusted time stamps are used to dejudder a series of video frames at a first detected input frame rate and then at a second detected input frame rate;
producing, using a timing generator, time axis information for coordinating video timing across one or more modules;
receiving, at an input frame and timing module, the time axis information;
detecting whether each video frame is a repeat frame or a new original frame;
storing in a buffer, using a memory device, a plurality of timestamps based on the time axis information, each timestamp corresponding to one new original frame received by the input frame and timing module;
receiving, at an N2M module, the time axis information; and
programming an offset delay, using the timing axis information, between a current time position (CT) and a display time position (DT).

10. The method of claim 9, wherein the offset delay is two times the change in time between two adjacent timestamps.

11. The method of claim 9, further comprising:
when the display time position (DT) is between a first timestamp and a second timestamp, using the N2M module for:
selecting a frame associated with the first timestamp as a previous frame (P1);
selecting a frame associated with the second timestamp as a current frame (CF); and
producing an interpolation phase in accordance with the formula:

(DT minus first timestamp) divided by (second timestamp minus first timestamp).

12. The method of claim 11, further comprising:
transmitting a command, from the N2M module to a frame rate converter module, the command including the interpolation phase, a frame index associated with the previous frame (P1), and a frame index associated with the current frame (CF).

13. The method of claim 12, further comprising:
interpolating, using the frame rate converter, one or more output video frames based on the interpolation phase, the frame index associated with the previous frame (P1), and the frame index associated with the current frame (CF); and
outputting a series of output video frames including the one or more interpolated video frames.

14. The method of claim 9, further comprising:
producing a raw new frame flag indicating whether each video frame is a repeat frame or a new original frame;
correlating a recognized non-video source pattern with the raw new frame flag to produce a correlation value for each video frame; and
producing a new frame flag based on the raw new frame flag and the correlation values.

15. The method of claim 12, further comprising:
determining, for each new original frame, whether to overwrite a previous frame based on the new frame flag;
overwriting the previous frame with the new original frame based on the overwrite determination;
determining whether to increment a frame index for each new original frame based on the new frame flag;
incrementing the frame index based on the increment determination; and
storing the frame index in the buffer.

16. The method of claim 14, further comprising:
detecting a first frame rate associated with the received video frames;
adjusting the timestamp for one or more of the new original frames to conform to a second frame rate different from the first frame rate; and
storing the adjusted timestamps in the buffer.

17. The method of claim 16, further comprising:
when the display time position (DT) is between a first timestamp and a second timestamp:
selecting a new original frame associated with the first timestamp as a previous frame (P1);
selecting a new original frame associated with the second timestamp as a current frame (CF); and
producing an interpolation phase for an interpolated video frame in accordance with the formula:

(DT minus first timestamp) divided by (second timestamp minus first timestamp).

* * * * *